(12) United States Patent
Wilson et al.

(10) Patent No.: US 11,708,027 B2
(45) Date of Patent: Jul. 25, 2023

(54) PIVOTABLE POWER TELESCOPING MIRROR ASSEMBLY

(71) Applicant: Motherson Innovations Company Limited, London (GB)

(72) Inventors: Douglas Wilson, Fort Gratiot, MI (US); David Ren, Attica, MI (US); Donald Depalma, Armada, MI (US); Alan Fraley, Cottrellville, MI (US); Jeffery Rode, Washington, MI (US); Anthony D'Andrea, Attica, MI (US)

(73) Assignee: Motherson Innovations Company Limited, London (GB)

( * ) Notice: Subject to any disclaimer, the term of this patent is extended or adjusted under 35 U.S.C. 154(b) by 127 days.

(21) Appl. No.: 17/198,494

(22) Filed: Mar. 11, 2021

(65) Prior Publication Data

US 2021/0291741 A1    Sep. 23, 2021

Related U.S. Application Data

(60) Provisional application No. 62/992,860, filed on Mar. 20, 2020.

(51) Int. Cl.
| | |
|---|---|
| *B60R 1/078* | (2006.01) |
| *B60R 1/12* | (2006.01) |
| *B60R 1/07* | (2006.01) |

(52) U.S. Cl.
CPC ............... *B60R 1/078* (2013.01); *B60R 1/07* (2013.01); *B60R 1/12* (2013.01); *B60R 1/1207* (2013.01); *B60R 2001/1253* (2013.01)

(58) Field of Classification Search
CPC .. B60R 1/02; B60R 1/06; B60R 1/062; B60R 1/07; B60R 1/074; B60R 1/078; B60R 1/12; B60R 1/1207; B60R 2001/1253
USPC .... 248/475.1, 476, 480, 466, 479, 485, 486; 359/841, 877, 872, 873, 881, 876
See application file for complete search history.

(56) References Cited

U.S. PATENT DOCUMENTS

| | | | | |
|---|---|---|---|---|
| 4,558,930 | A * | 12/1985 | Deedreek | G02B 7/1827 359/881 |
| 4,907,871 | A * | 3/1990 | Hou | B60R 1/078 248/478 |
| 5,483,385 | A * | 1/1996 | Boddy | B60R 1/078 359/872 |
| 5,969,890 | A * | 10/1999 | Whitehead | B60R 1/078 359/881 |
| 6,276,805 | B1 * | 8/2001 | Home | B60R 1/076 248/512 |
| 6,276,808 | B1 * | 8/2001 | Foote | B60R 1/078 248/479 |

(Continued)

*Primary Examiner* — Terrell L McKinnon
*Assistant Examiner* — Michael McDuffie
(74) *Attorney, Agent, or Firm* — Jones Day (57) ABSTRACT

A power telescoping mirror pivot assembly includes a base frame, a first telescoping arm and a second telescoping arm, wherein the first telescoping arm is pivotally attached at its first end of the base frame and the second telescoping arm is pivotally attached at its first end to the base frame, a telescoping frame assembly comprising a telescoping motor, wherein the telescoping motor is mounted to the telescoping frame assembly and is attached at a second end of the first telescoping arm and at a second end of the second telescoping arms, and a mirror head attached to the telescoping frame assembly.

16 Claims, 13 Drawing Sheets

(56) References Cited

U.S. PATENT DOCUMENTS

| | | | | |
|---|---|---|---|---|
| 6,394,616 B1* | 5/2002 | Foote | ............... | B60R 1/074 |
| | | | | 359/881 |
| 6,505,943 B1* | 1/2003 | Olijnyk | ............... | B60R 1/078 |
| | | | | 359/881 |
| 6,755,543 B1* | 6/2004 | Foote | ............... | B60R 1/078 |
| | | | | 359/872 |
| 6,863,407 B1* | 3/2005 | Olijnyk | ............... | B60R 1/0612 |
| | | | | 359/872 |
| 6,877,868 B2* | 4/2005 | Olijnyk | ............... | B60R 1/078 |
| | | | | 359/872 |
| 7,159,992 B2* | 1/2007 | Foote | ............... | B60R 1/078 |
| | | | | 248/480 |
| 7,287,867 B2* | 10/2007 | Wellington | ............... | B60R 1/07 |
| | | | | 359/865 |
| 7,303,294 B1* | 12/2007 | Ruse | ............... | B60R 1/0617 |
| | | | | 248/479 |
| 7,441,911 B2* | 10/2008 | Ruse | ............... | B60R 1/0605 |
| | | | | 248/478 |
| 7,594,731 B2* | 9/2009 | Sinelli | ............... | B60R 1/025 |
| | | | | 359/872 |
| 7,748,857 B2* | 7/2010 | Fimeri | ............... | B60R 1/078 |
| | | | | 248/479 |
| 7,825,951 B2* | 11/2010 | Lang | ............... | B60R 1/12 |
| | | | | 348/148 |
| 7,866,835 B2* | 1/2011 | Liu | ............... | B60R 1/078 |
| | | | | 248/475.1 |
| 9,057,833 B2* | 6/2015 | Bowers | ............... | G02B 7/182 |
| 11,358,527 B2* | 6/2022 | Wilson | ............... | B60R 1/078 |
| 2008/0100939 A1* | 5/2008 | Brester | ............... | B60R 1/06 |
| | | | | 359/872 |

* cited by examiner

PIVOTABLE POWER TELESCOPING MIRROR ASSEMBLY

CROSS-REFERENCE TO RELATED APPLICATION

This application claims the benefit of U.S. Provisional Patent Application No. 62/992,860, filed Mar. 20, 2021, which is hereby incorporated by reference in its entirety for all purposes.

FIELD

The present disclosure relates to vehicle external mirror assemblies and in particular to mirror assemblies having motor mechanisms for adjustment.

BACKGROUND

The statements in this section merely provide background information related to the present disclosure and may not constitute prior art.

Power telescoping mirrors were developed to allow the mirror head to be extended or retracted by the user from inside a vehicle. The extension and retraction of the mirror can be controlled to accommodate different conditions desired by the user. These conditions include the width and length of the towing vehicle. One problem faced by power telescoping mirrors is supporting the weight of the mirror head and all accessories/features included in the mirror head when fully extended. A further problem faced is pivoting the mirror assembly including the telescoping structure needed to support a fully extended mirror head assembly Another problem is current telescoping mirrors pivot the mirror head or the mirror reflective element which limits the field of vision available. Information relevant to attempts to address these problems can be found in US20190016265, U.S. Pat. Nos. 7,172,298 and 6,726,337. However, each one of these references suffers from the disadvantages of a telescoping design which has a limited range for pivoting adjustment.

SUMMARY

Generally, the present disclosure provides a dual arm pivotable power telescoping mirror assembly.

In an aspect, a power telescoping mirror pivot assembly includes a base frame; a first powerfold motor and a second powerfold motor mounted to the base frame; a first telescoping arm and a second telescoping arm, wherein the first telescoping arm is attached to the first powerfold motor at a first end of the first telescoping arm and the second telescoping arm is attached to the second powerfold motor at a first end of the second telescoping arm; a telescoping frame assembly comprising a telescoping motor, wherein the telescoping motor is attached at a second end of the first telescoping arm and also attached at a second end of the second telescoping arms; and a mirror head attached to the telescoping frame assembly.

In another aspect, a power telescoping mirror pivot assembly includes a base frame; a first telescoping arm and a second telescoping arm, wherein the first telescoping arm is pivotally attached at its first end of the base frame and the second telescoping arm is pivotally attached at its first end to the base frame; a telescoping frame assembly comprising a telescoping motor, wherein the telescoping motor is mounted to the telescoping frame assembly and is attached at a second end of the first telescoping arm and at a second end of the second telescoping arms; and a mirror head attached to the telescoping frame assembly.

In another aspect, a rearview device includes a power telescoping mirror pivot assembly having a base frame; a first telescoping arm and a second telescoping arm, wherein the first telescoping arm is pivotally attached at its first end of the base frame and the second telescoping arm is pivotally attached at its first end to the base frame; a telescoping frame assembly comprising a telescoping motor, wherein the telescoping motor is mounted to the telescoping frame assembly and is attached at a second end of the first telescoping arm and at a second end of the second telescoping arms; and a mirror head attached to the telescoping frame assembly.

In another aspect, a motor vehicle, includes a rearview device including a power telescoping mirror pivot assembly having a base frame; a first telescoping arm and a second telescoping arm, wherein the first telescoping arm is pivotally attached at its first end of the base frame and the second telescoping arm is pivotally attached at its first end to the base frame; a telescoping frame assembly comprising a telescoping motor, wherein the telescoping motor is mounted to the telescoping frame assembly and is attached at a second end of the first telescoping arm and at a second end of the second telescoping arms; and a mirror head attached to the telescoping frame assembly.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
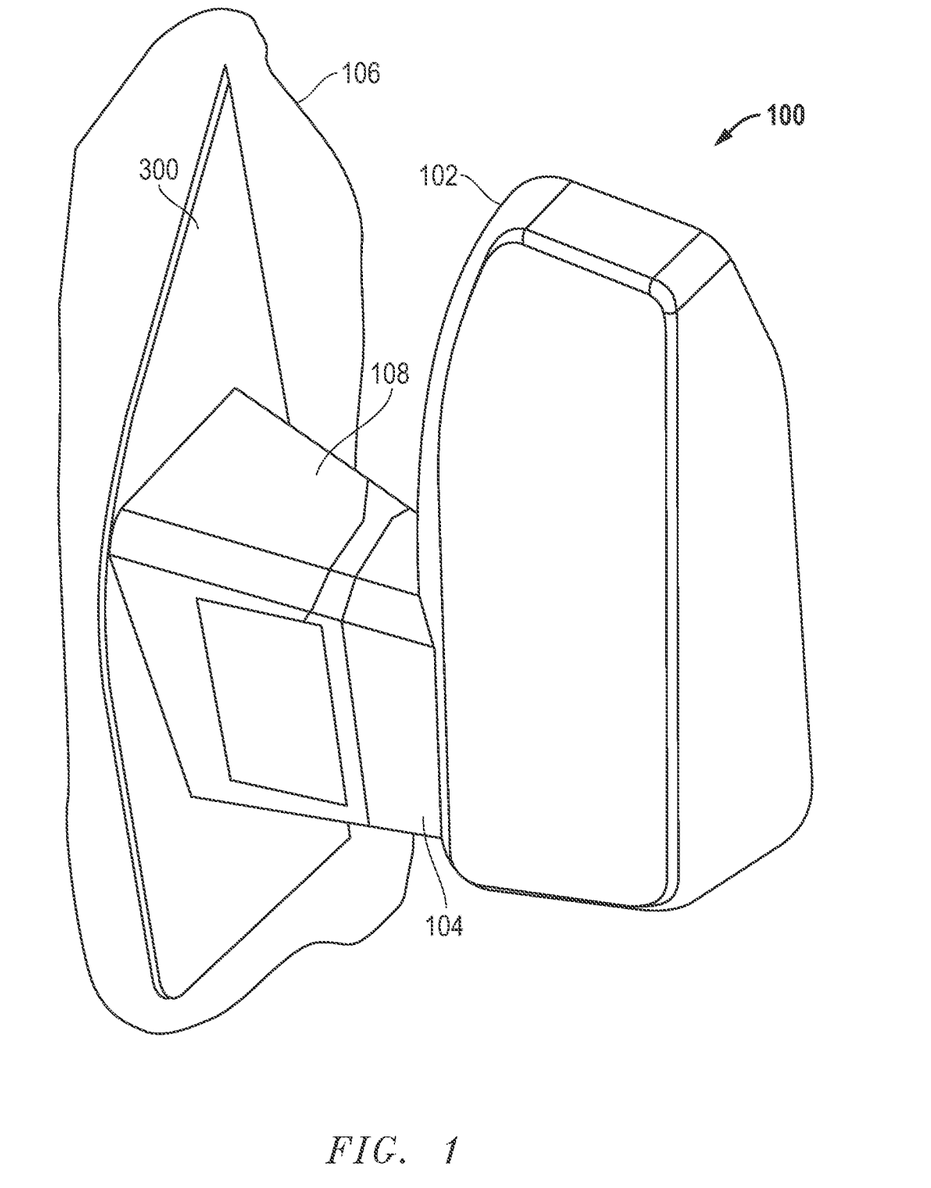
FIG. 1 is an isometric, assembled rear view of a pivotable telescoping mirror assembly according to the teachings of the present disclosure.

As shown in FIG. 1, the pivotable telescoping mirror assembly 100 contains a base frame 300 which is attached to a vehicle 106. The vehicle 106 mounting is typically the A-pillar and/or door panel of the vehicle however it is within the scope of this disclosure to mount the base frame 300 to other parts of the vehicle 106. The assembly has a base cover 108 which is fixed to the base frame 300. A second cover 104 is slidably attached to the base cover 108 and attached to the mirror head 102. The second cover 104 extends and retracts with the mirror head 102 during the telescoping movement of a mirror head 102. During the extension and retraction cycle, the base cover 108 and the second cover 104 are designed to overlap or are superimposed into one another during the telescoping cycle.

Figure 2:
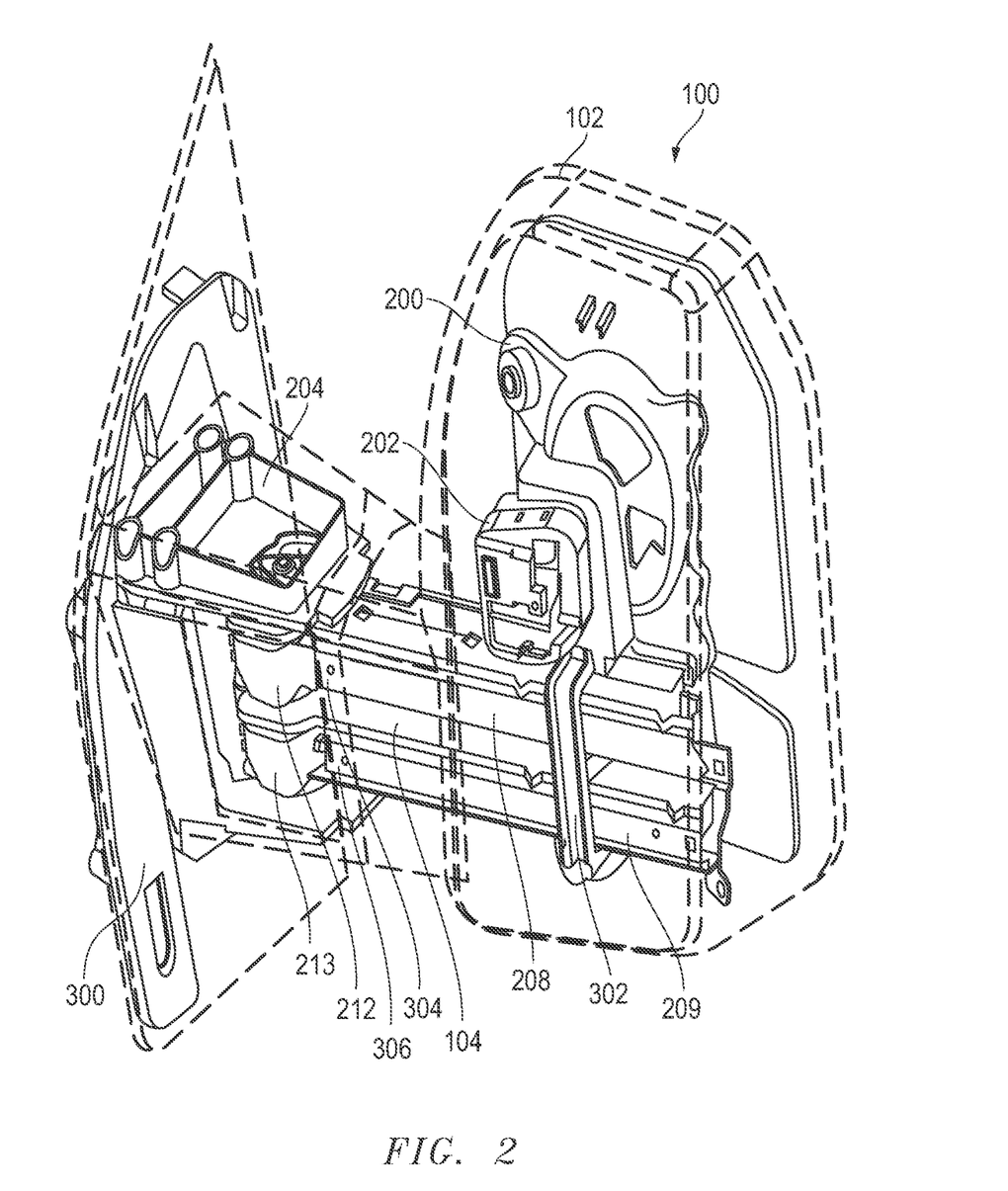
FIG. 2. is an isometric, assembled rear view with a transparent scalp and covers of the pivotable telescoping mirror assembly according to the teachings of the present disclosure.
Figure 3:
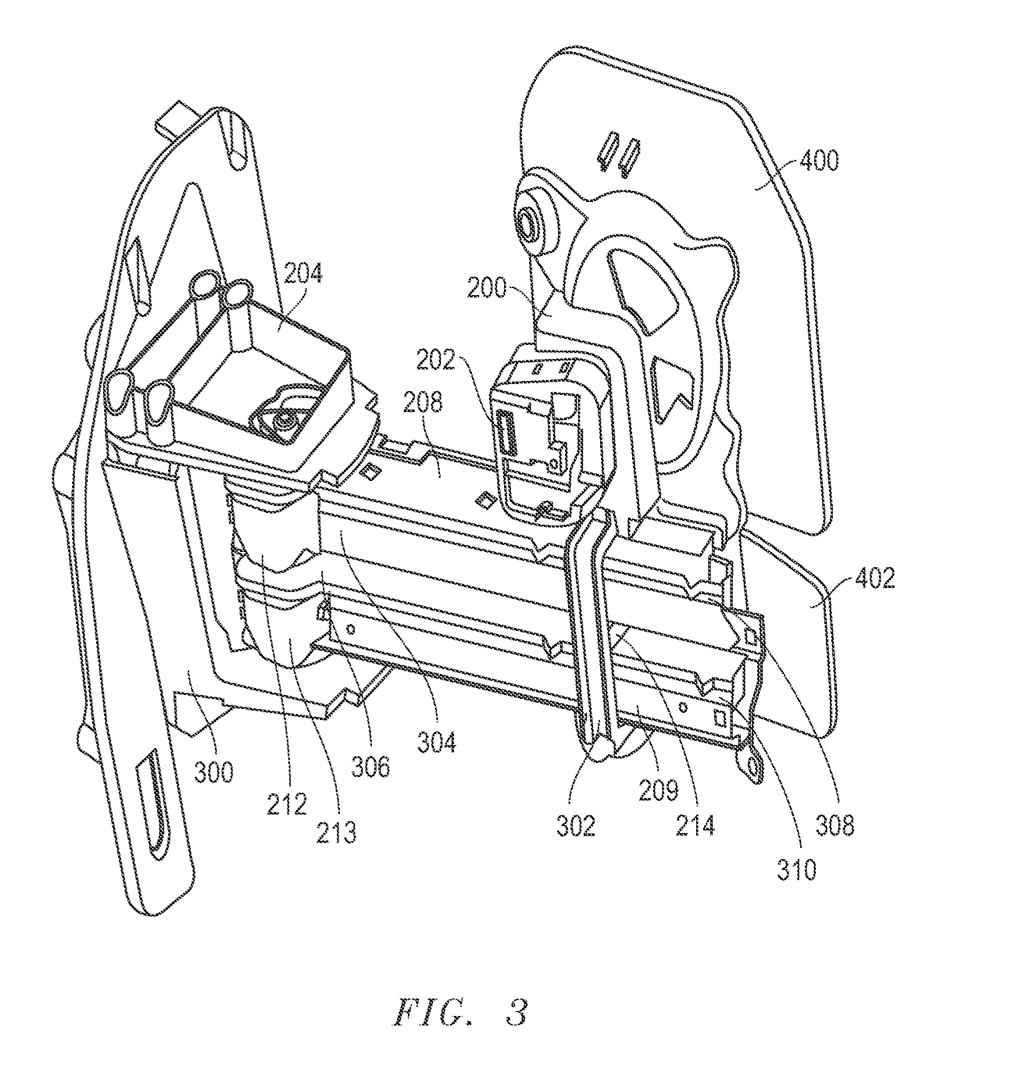
FIG. 3 is an interior isometric rear view of the pivotable telescoping mirror assembly according to the teachings of the present disclosure.
Figure 5:
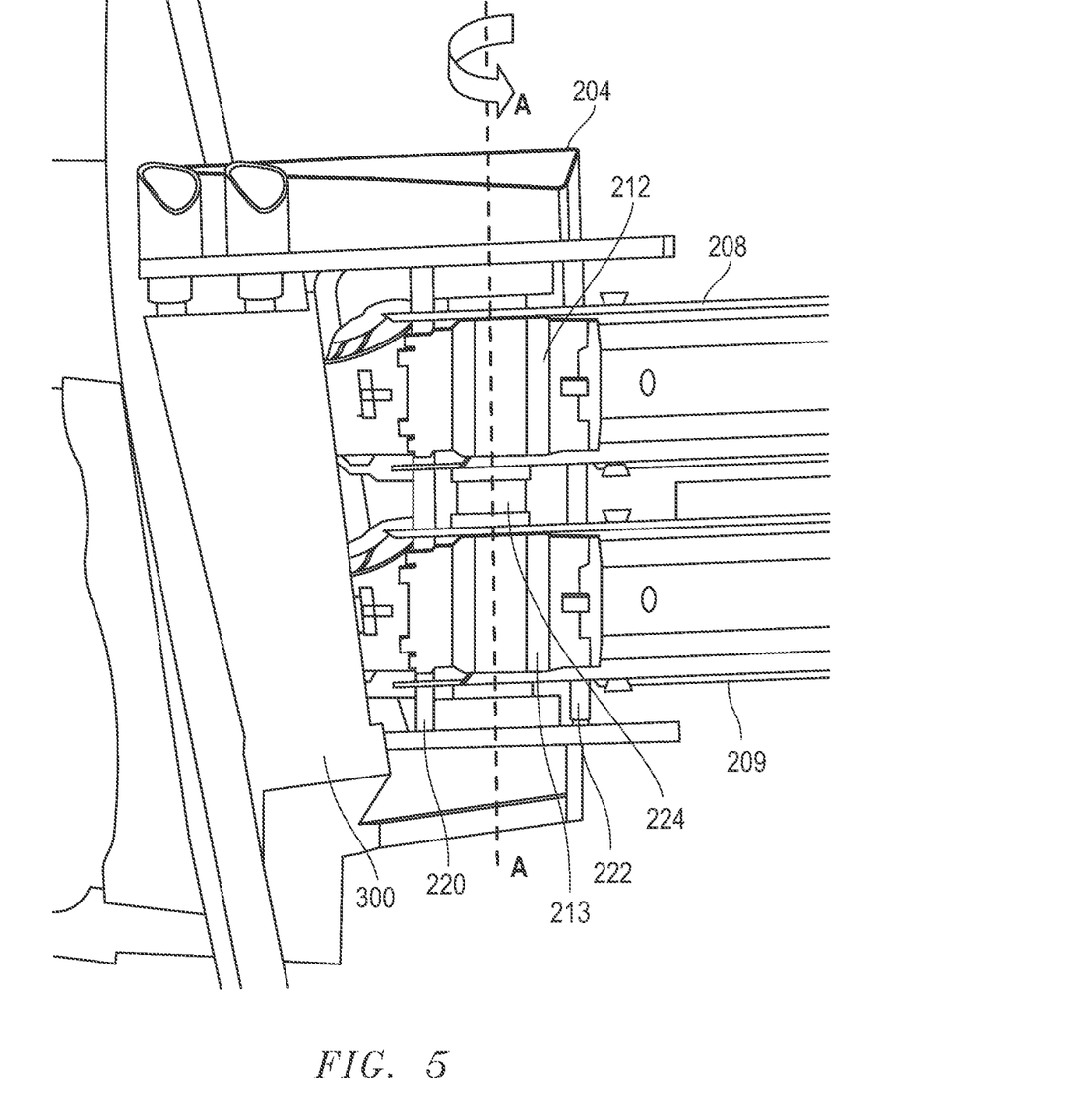
FIG. 5 is a rear view of the powerfold motor mounting system according to the teachings of the present disclosure.

FIGS. 2 and 3 illustrate the interior structure of the pivotable telescoping mirror assembly 100. An upper bracket 204 in cooperation with the base frame 300 provide a structural mounting location for a first powerfold motor 212 and a second powerfold motor 213. A first telescoping arm assembly 208 attaches to the first powerfold motors 212 at a first end 304. The second telescoping arm assembly 209 attaches to the powerfold motor 213 at a first end 306. When the first and second powerfold motors 212, 213 are electrically engaged, they provide rotational movement to telescoping arm assemblies 208 and 209 around the axis A-A (FIG. 5). The first and second powerfold motors 212, 213 are not synchronized with each other. The first telescoping arm assembly 208 and second telescoping arm assembly 209 operationally connect each at a second end 308, 310 respectively to the telescoping motor 202, as best illustrated in FIG. 3. The telescoping motor 202 and the arm bracket 302 are attached to the telescoping frame 200. Arm bracket 302 can provide restriction in vertical movement and can maintains spacing between the first and second telescoping arm assemblies 208, 209. Arm bracket 302 has a support element 214 which is attached at bracket 302 and frame 200. The telescoping motor 202 when energized provides translation movement to extend and retract the second ends 308, 310 of the first and second telescoping arm assemblies 208, 209 with respect to vehicle 106 (shown in FIG. 1). The telescoping function is controlled by the telescoping motor 202 which drives thru both the first and second telescoping arm assemblies 208, 209. The first and second telescoping arm assemblies 208, 209 in the present disclosure are identical but based on design limitations the first and second telescoping arms 208, 209 may be different.

In FIG. 3, a first reflective element 400 is the main mirror surface attached to the telescoping frame 200. A second reflective element 402 may be a spotter mirror attached to the telescoping frame 200. The first and second reflective elements 400, 402 rotate with the first and second telescoping arms 208, 209 when the first and second telescoping arms are rotated around axis A-A, as illustrated in FIG. 5. The first and second reflective elements 400, 402 experience translation movement to extend and retract with respect to the vehicle 106 (shown in FIG. 1) when the second ends 308, 310 of the first and second telescoping arm assemblies 208, 209 are moved by the telescoping motor 202. The first and second reflective elements 400, 402 may also include features such as EC Glass, heated main glass and spotters, power actuated main and spotter glass, blind zone signal markers and/or approach lamps.

Figure 4:
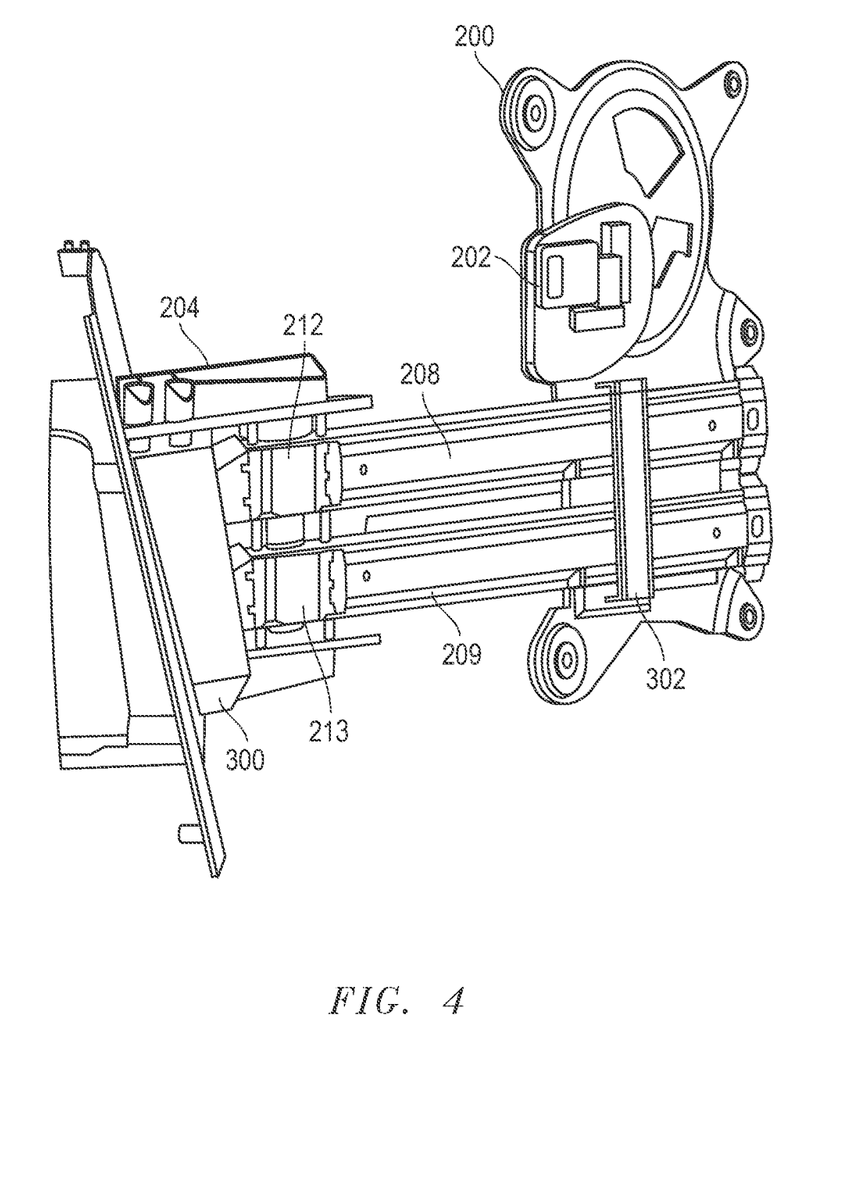
FIG. 4 is a rear view of the pivotable telescoping mirror assembly according to the teachings of the present disclosure.

In the exemplary example shown in FIG. 4, base frame 300 is shown supporting the powerfold motors 212, 213. The powerfold motors in this disclosure are identical powerfold motors but it is within the scope of this invention for the powerfold motors 212, 213 to be different.

In FIG. 5, base frame 300 includes an integral central shaft (not shown) extending from the base frame 300 toward the upper bracket 204. Mounted on the central shaft (not shown) are the second powerfold motor 213, a locking element 224, and the first powerfold motor 212. The first and second telescoping arm assemblies are also assembled with the central shaft (not shown) at the first ends 304, 306. Additional parts may be added to the central shaft such as washers or bushings. The central shaft (not shown) provides the rotational axis A-A for the rotational movement of the first and second telescoping arm assemblies 208, 209. The first powerfold motor 212 and the second powerfold motor 213 are connected by a first pin 220 and a second pin 222. A locking element 224 acts as a dimensional spacer between the first and second powerfold motor 212, 213 and connects the first and second powerfold motors 212, 213 to the central shaft (not shown). The central shaft (not shown) for mounting the first and second powerfold motors and the first and second telescoping arm assemblies may be designed as a separate element from the base frame 300 which would then be connected to the base frame 300 and the upper bracket 204.

Figure 6:
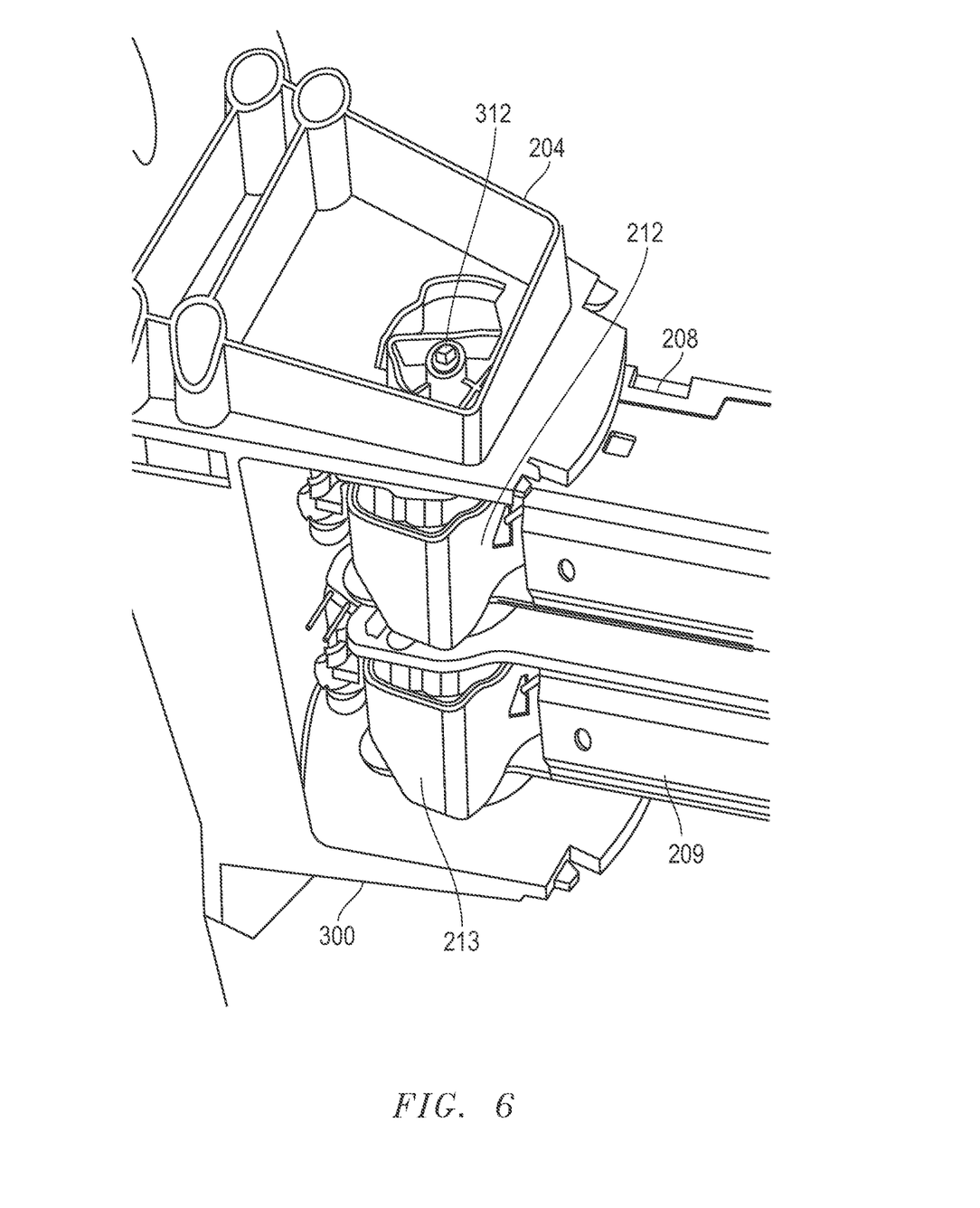
FIG. 6 is a top isometric view of the powerfold motor mounting system according to the teachings of the present disclosure.

FIG. 6 is an isometric view from a top perspective illustrating the attachment of the first telescoping arm assembly 208 to the first powerfold motor 212. As already illustrated in other figures, the first telescoping arm assembly 208 and the second telescoping arm assembly 209 are attached to the base frame 300 and connect to the first and second powerfold motors 212, 213. The first telescoping arm assembly 208 is connected at a top and a bottom surface of the first powerfold motor 212. Upper bracket 204 mounts to base frame 300 and to the central shaft (not shown) at fastener 312.

Figure 7:
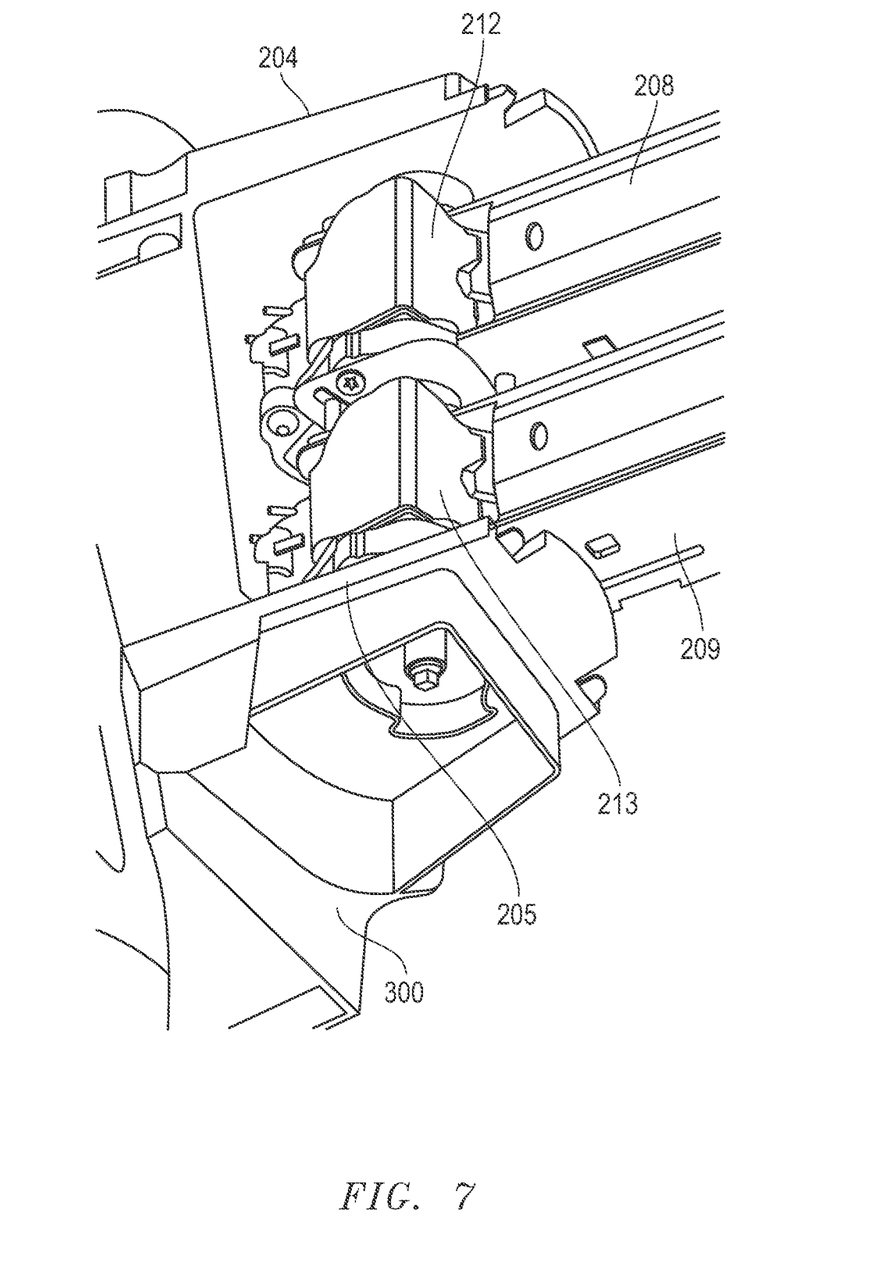
FIG. 7 is a bottom isometric view of the powerfold motor mounting system according to the teachings of the present disclosure.

FIG. 7 is an isometric view from a bottom perspective illustrating the attachment of the second telescoping arm assembly 209 to the second powerfold motor 213. As already illustrated in other figures, the first telescoping arm assembly 208 and the second telescoping arm assembly 209 are attached to the base frame 300 and connect to the first and second powerfold motors 212, 213. The second telescoping arm assembly 209 is attached to the second powerfold motor 213 at a top and a bottom surface of the second powerfold motor 213.

Figure 8:
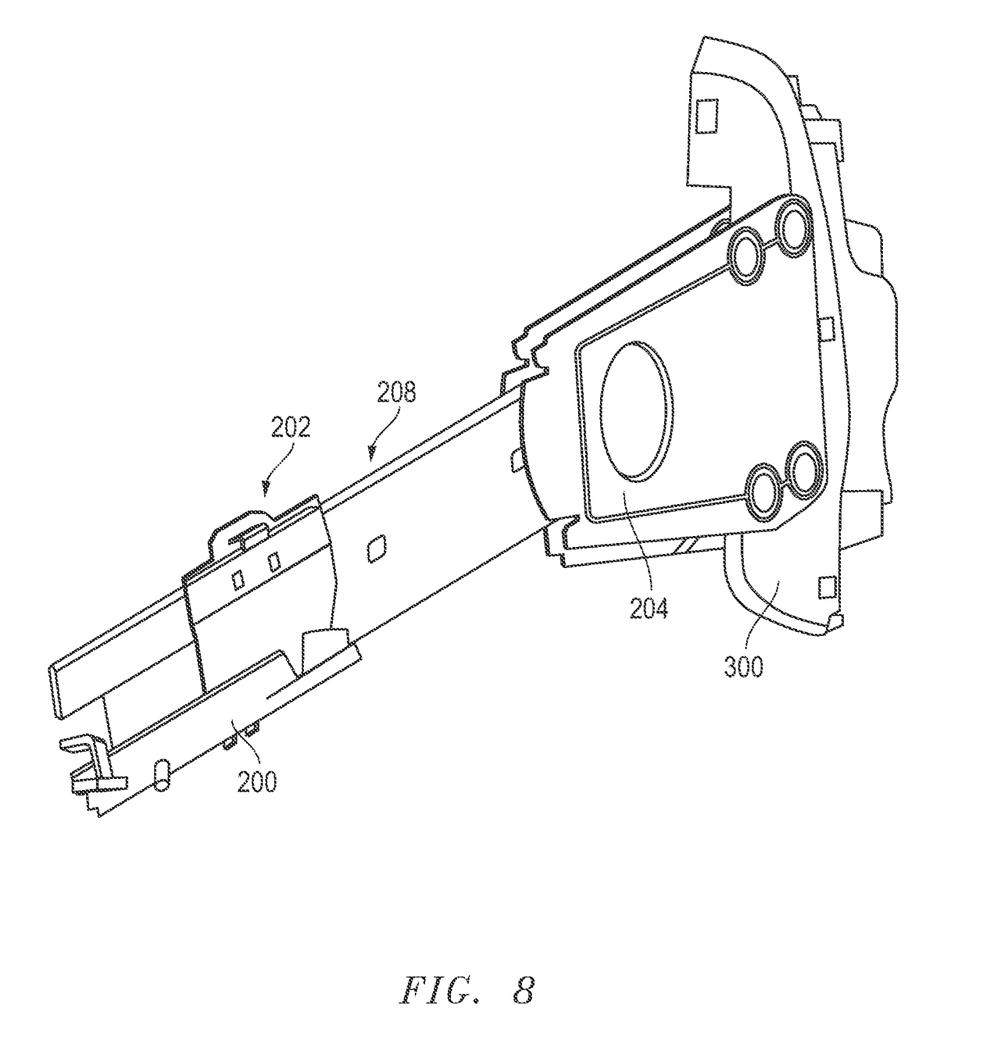
FIG. 8 is a top view of the pivotable telescoping mirror assembly structure according to the teachings of the present disclosure.

In FIG. 8, a top view of the upper bracket 204 is shown in relation to the base frame 300 and the first telescoping arm assembly 208. The telescoping motor 202 is shown attached to the back of the telescoping frame 200. This allows telescoping movement of the first and second reflective elements 400, 402.

Figure 9:
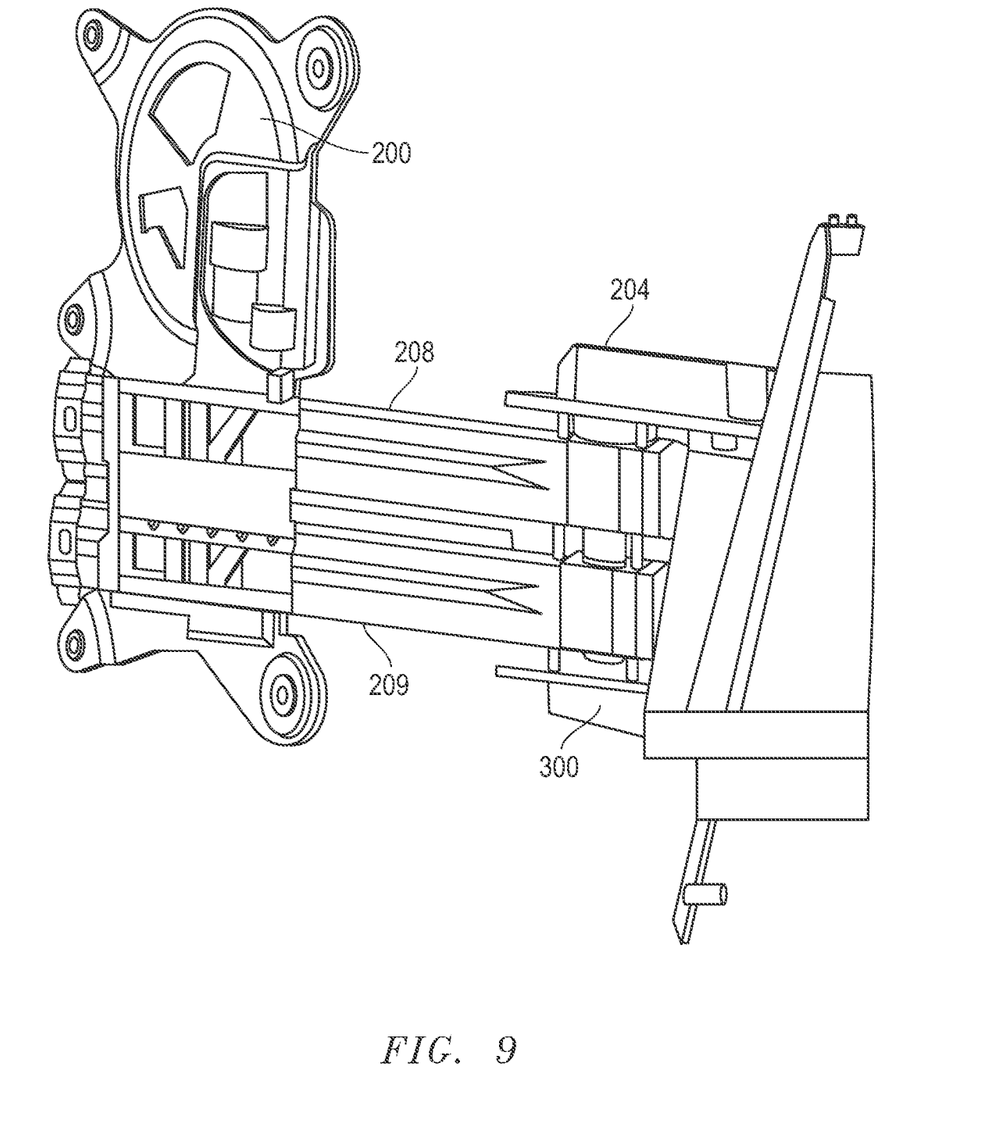
FIG. 9 is front view of the pivotable telescoping mirror assembly structure according to the teachings of the present disclosure.

FIG. 9 is a front view of the telescoping frame 200. In FIG. 9, the telescoping frame 200 is shown moveably attached to the first and second arm assemblies 208, 209 to allow for telescoping movement of the first and second reflective elements 400, 402. In addition, the upper bracket 204 is shown as attached to the base frame 300.

Figure 10:
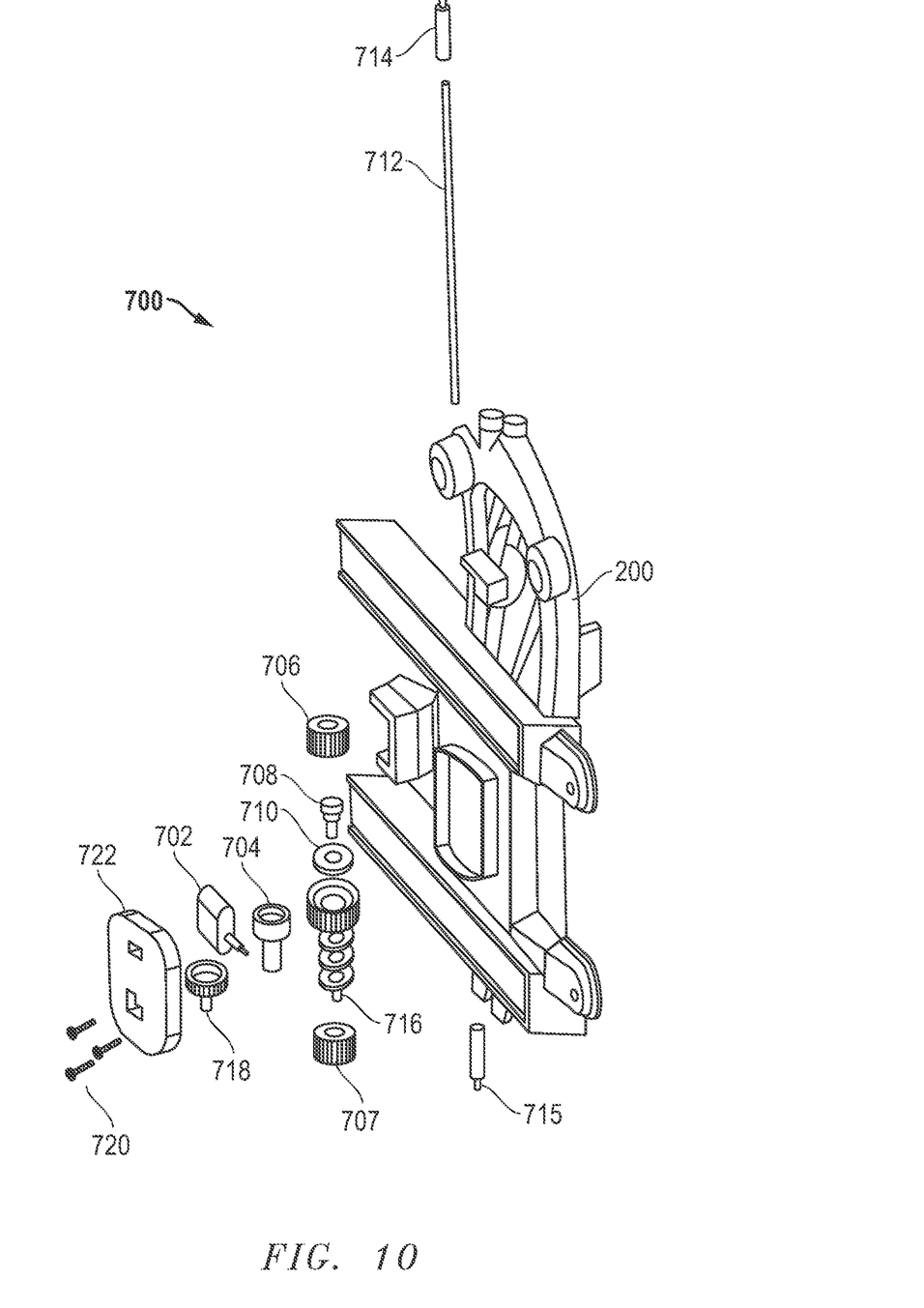
FIG. 10 is an exploded view of the telescoping mirror frame assembly according to the teachings of the present disclosure.

In FIG. 10, a telescoping frame assembly 700 of the telescoping frame 200 is shown in an exploded view. More specifically, the telescoping frame assembly 700 illustrates in more detail the elements of the telescoping motor 202 along as attached to the frame 200. The frame assembly 700 and telescoping motor 202 include elements 702, 704, 706, 708, 710, 707, 715, 716, 718, 720, which include various attachment features such as pins, screws, and washers 708, 710, 712, 714, 715, 720, motor gears or gear wheels 718, 707, 706, the motor and motor rod 702, 704, and a cover plate 722.

Figure 11:
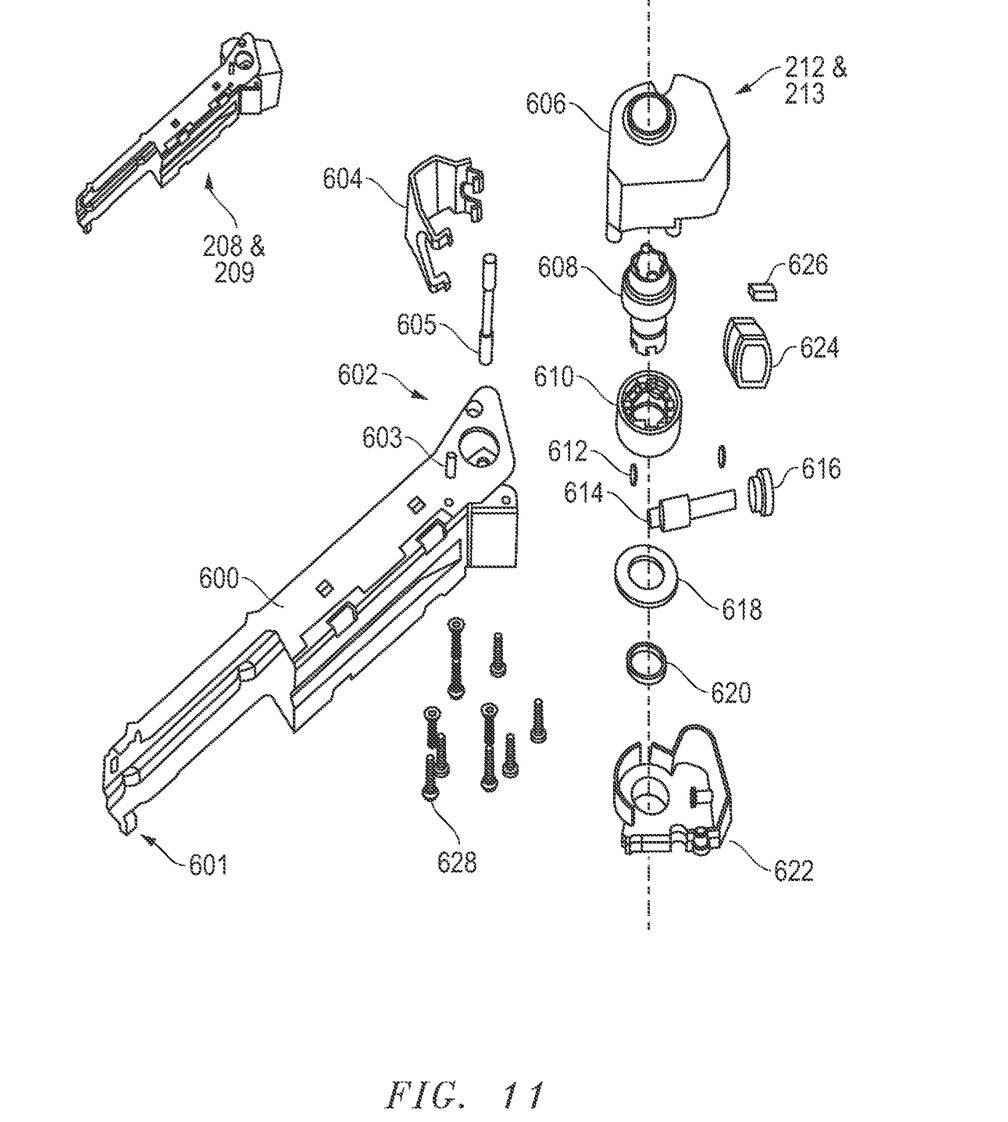
FIG. 11 is an exploded view of the telescoping arm assembly and powerfold motor according to the teachings of the present disclosure.

FIG. 11 illustrates an exploded view of the first and second telescoping arm assemblies 208 and 209. The first and second telescoping arm assemblies 208, 209 include elements 600, 601, 602, 603, 604, 605, 628 which include each arm 600, arm ends 601, 602, and attachment features such as pins, screws, washers, and brackets 603, 604, 605, 628. The first and second powerfold motors 212, 213 are also shown as an exploded view including elements 606, 608, 610, 612, 614, 616, 618, 620, 622, 624, 626 which include the motors, motor attachments features such as motor gears, cams, pins, screws, washers, and cover plates.

Figure 12:
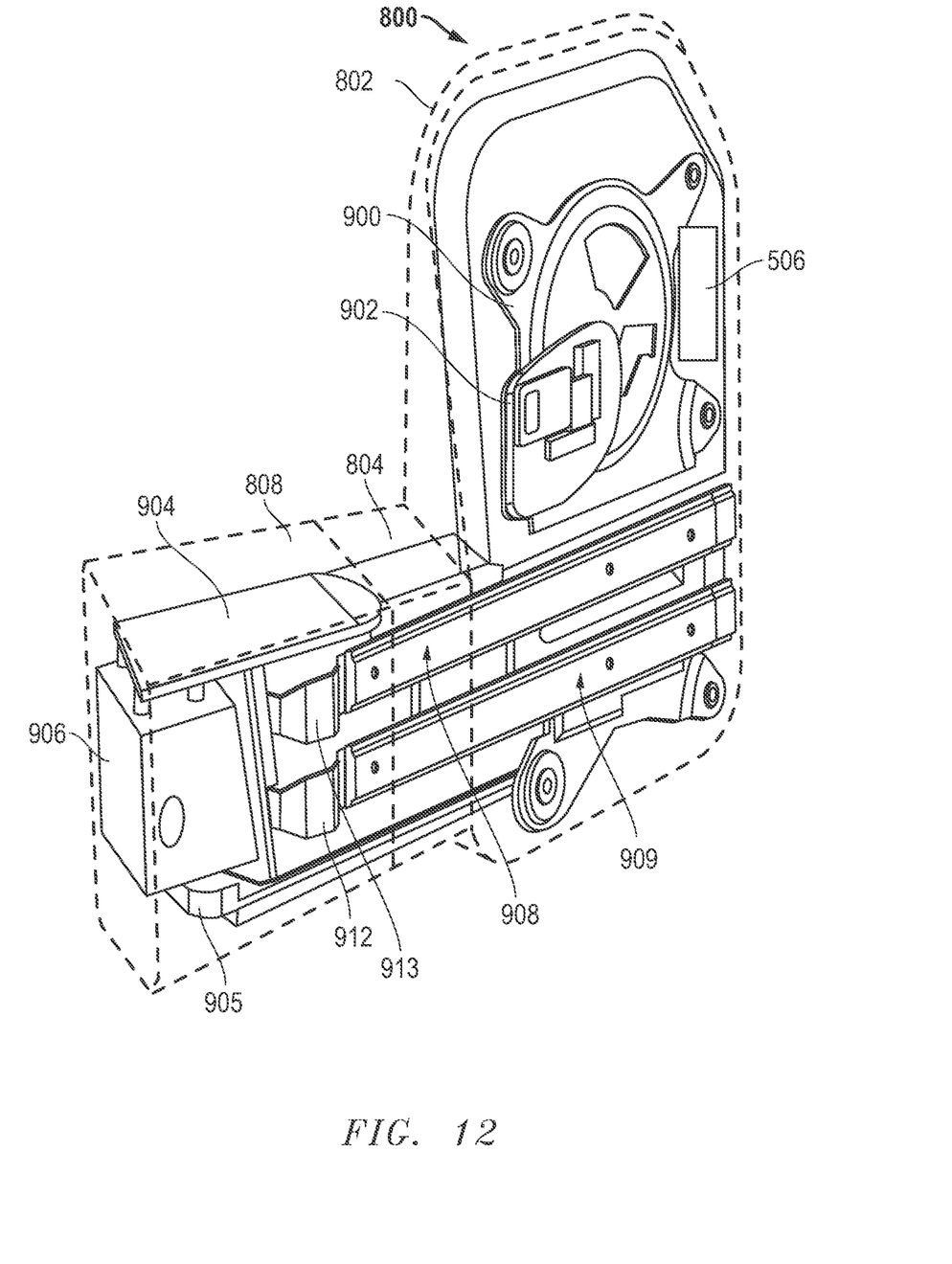
FIG. 12 is an isometric, assembled rear perspective of a second embodiment for the pivotable power telescoping mirror assembly according to the teachings of the present disclosure.

FIG. 12 shows a rear isometric view of a second pivoting power telescoping mirror assembly embodiment 800. A pivot mounting frame 906 is attached to an upper bracket 904 and a lower bracket 905. A base cover 808 is attached to the pivot mounting frame 906, and a slidable cover 804 is attached to the scalp 802 to slide in and out of the base cover 808 and form a slidable cover assembly 804, 808. A lower powerfold motor 912 and an upper powerfold motor 913 are mounted on a central shaft (not shown) between the upper bracket 904 and the lower bracket 905. An upper telescoping arm assembly 908 and a lower telescoping arm assembly 909 are mounted to the upper and lower powerfold motors 912 and 913 and the central shaft (not shown) in the method describe above for first and second powerfold motors 212, 213 connecting to first and second telescoping arm assemblies 208, 209. In this embodiment a first illumination module 506 is shown. This first illumination module 506 may be any kind of light module such as an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof.

Figure 13:
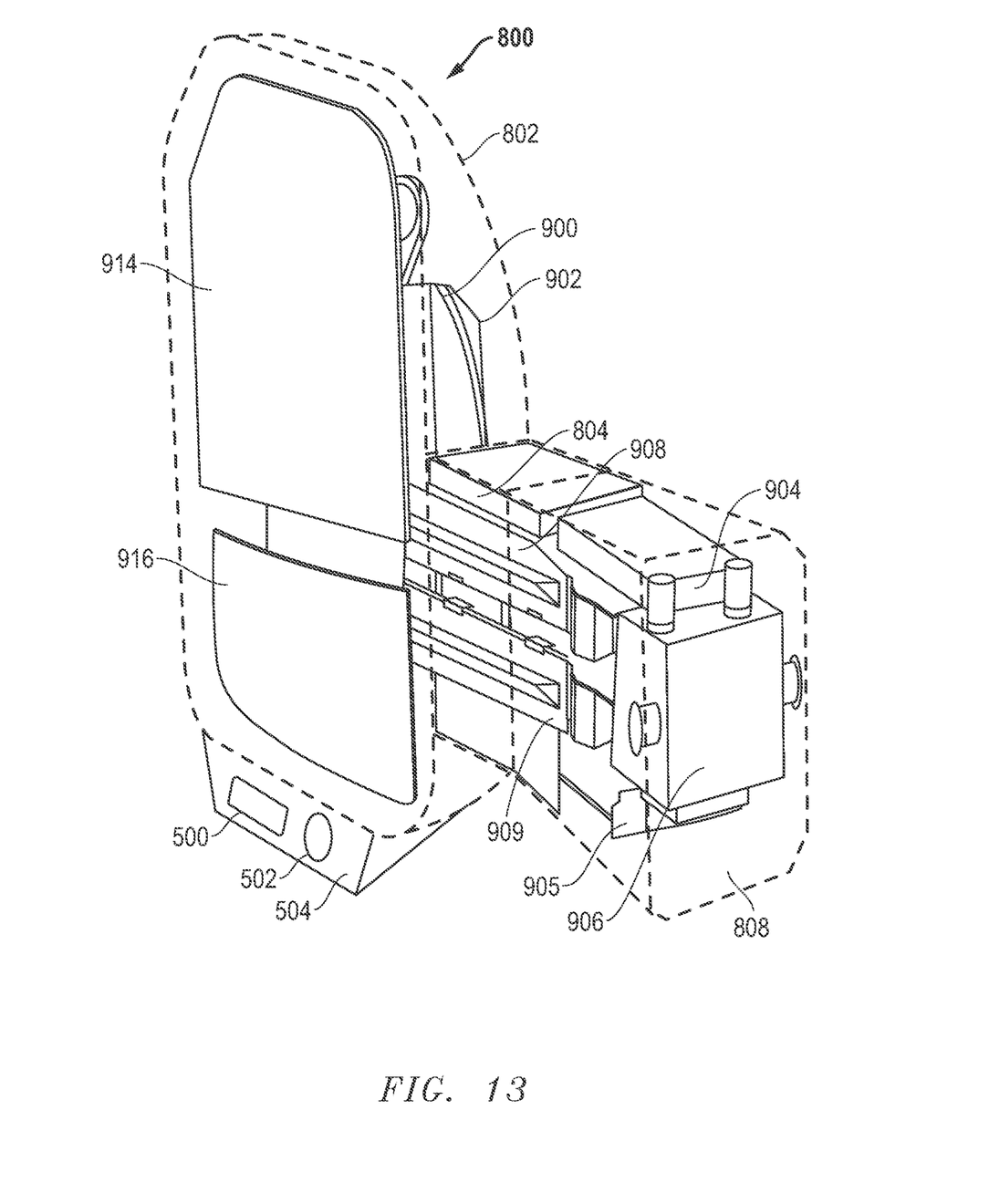
FIG. 13 is an isometric, assembled front perspective of a second embodiment for the pivotable power telescoping mirror assembly according to the teachings of the present disclosure.

A second illumination module 500 is seen attached on a case rear 504 in FIG. 13. The second illumination module 500 may be any type of illumination describe with respect to the first illumination module 506 and in any combination with the first illumination module 506. A camera 502 is mounted in the case rear 504 of mirror head assembly 800. The camera 502 may have functions and devices to enhance, extend and/or sustain the functionality of the rearview device during normal or extreme conditions. These devices can comprise heating and/or cooling means, cleaning means such as wipers, liquid and/or gaseous sprays, actuator means for moving the rearview device or parts of it, such as for example a display, a camera system and/or parts of a camera system, comprising for example lenses, filters, light sources, adaptive optics like deformable mirrors, sensors and/or mirrors, and/or actuator means for inducing movement of other objects, for example parts of the vehicle and/or objects surrounding the vehicle. Furthermore camera 502 can include linear tracks and/or rotating wheels, like for example a filter wheel, for exchanging optical elements, comprising for example lenses, mirrors, light sources, sensors, and adaptive optics like deformable mirrors and/or filters. The camera 502 may also be fixed (stationary mounted) or dynamic and move with the mirror head 800 during extension cycle of the upper and lower telescoping arm assemblies 908, 909. The movement of the upper and lower telescoping arm assemblies 908, 909 are identical to the first and second telescoping arm assembly 208, 209 described above. Mirror head assembly may also include sensors to provide input to the vehicle 106. Examples of sensors could include a light sensor, a rain sensor, a temperature sensors, radar, Wi-Fi and ultrasonic sensors.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary 25 depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for 5 practicing the disclosure in its various exemplary embodiments. In particular, all claim feature combinations, irrespective of the claim dependencies, are covered with this application.

REFERENCE LIST

100—Pivotable Telescoping Mirror Assembly
102—Mirror Head
104—Second Cover
106—Vehicle
108—Base Cover
200—Mounting Frame
202—Telescoping Motor
204—Upper Bracket
208—First Telescoping Arm Assembly
209—Second Telescoping Arm Assembly
212—First Powerfold Motor
213—Second Powerfold Motor
214—Support Element
220—First Pin
222—Second Pin
224—Locking element
300—Base Frame
302—Arm Bracket
304—First end of arm assembly 208
306—First end of arm assembly 209
308—Second end of arm assembly 208

310—Second end of arm assembly 209
312—Fastener
400—First Reflective Element
402—Second Reflective Element
500—Second Illumination Module
502—Camera
504—Case Rear
506—First Illumination Module
600—Arm
601, 602—Arm Ends
603, 604, 605, 628—Pins, Screws, Washers, and Brackets
606, 608, 610, 612, 614, 616, 618, 620, 622, 624, 626—Motor and Actuator Components
700—Telescoping Frame Assembly
702, 704—Motor and Motor Rod
706, 707, 718—Motor Gears
708, 710, 712, 714, 715, 720—Pins, Screws, and Washers
722—Cover Plate
800—Mirror Head Assembly
802—Scalp
804—Second Cover
808—Base Cover
900—Mounting Frame
904—Upper Mounting Bracket
905—Lower Mounting Bracket
906—Pivot mounting Frame
908—Upper Telescoping Arm Assembly
909—Lower Telescoping Arm Assembly
912—Lower Powerfold Motor
913—Upper Powerfold Motor
914—Main Mirror
916—Spotter Mirror

What is claimed is:

1. A power telescoping mirror pivot assembly, comprising:
   a base frame;
   a first powerfold motor and a second powerfold motor mounted to the base frame;
   a first telescoping arm and a second telescoping arm, wherein the first telescoping arm is attached to the first powerfold motor at a first end of the first telescoping arm and the second telescoping arm is attached to the second powerfold motor at a first end of the second telescoping arm;
   a telescoping frame assembly comprising a telescoping motor, wherein the telescoping motor is attached at a second end of the first telescoping arm and also attached at a second end of the second telescoping arms;
   a mirror head attached to the telescoping frame assembly; and
   a locking element positioned between the first and second powerfold motors which is configured to act as a dimensional spacer between the first and second powerfold motor and to connect the first and second powerfold motors to a central shaft.

2. The power telescoping mirror pivot assembly of claim 1, further comprising at least one pin connecting the first and second powerfold motors.

3. The power telescoping mirror pivot assembly of claim 1, further comprising a slidable cover assembly attached at a pivot mounting frame, the slidable cover assembly comprising a base cover which is attached to the base fame and a slidable cover which is attached to the mirror head and slides with respect to the base cover.

4. The power telescoping mirror pivot assembly of claim 1, further comprises at least one light module attached to the mirror head.

5. The power telescoping mirror pivot assembly of claim 4, wherein the at least one light module is at least one of a forward facing spotlight, a rearward facing spotlight, a puddle light, a turn indicator light, or a side marker light.

6. The power telescoping mirror pivot assembly of claim 1, further comprising a camera module attached to the mirror head.

7. The power telescoping mirror pivot assembly of claim 1, wherein the first and second powerfold motors are configured to rotate the first and second telescoping arm simultaneously with respect to the base frame.

8. A power telescoping mirror pivot assembly, comprising:
   a base frame;
   a first telescoping arm and a second telescoping arm, wherein the first telescoping arm is pivotally attached at its first end of the base frame and the second telescoping arm is pivotally attached at its first end to the base frame;
   a first powerfold motor and a second powerfold motor mounted to the base frame, the first and second powerfold motors being configured to rotate the first and second telescoping arm simultaneously with respect to the base frame;
   a telescoping frame assembly comprising a telescoping motor, wherein the telescoping motor is mounted to the telescoping frame assembly and is attached at a second end of the first telescoping arm and at a second end of the second telescoping arms;
   a mirror head attached to the telescoping frame assembly; and
   a locking element positioned between the first and second powerfold motors which is configured to act as a dimensional spacer between the first and second powerfold motor and to connect the first and second powerfold motors to a central shaft.

9. The power telescoping mirror pivot assembly of claim 8 further comprising at least one pin connecting the first and second powerfold motors.

10. The power telescoping mirror pivot assembly of claim 8, further comprising a slidable cover assembly attached at a pivot mounting frame, the slidable cover assembly comprising a base cover which is attached to the base fame and a slidable cover which is attached to the mirror head and slides with respect to the base cover.

11. The power telescoping mirror pivot assembly of claim 8, further comprises at least one light module attached to the mirror head.

12. The power telescoping mirror pivot assembly of claim 11, wherein the at least one light module is at least one of a forward facing spotlight, a rearward facing spotlight, a puddle light, a turn indicator light, or a side marker light.

13. The power telescoping mirror pivot assembly of claim 8, further comprising a camera module attached to the mirror head.

14. A power telescoping mirror pivot assembly, comprising:
   a base frame;
   a first powerfold motor and a second powerfold motor mounted to the base frame;
   a first telescoping arm and a second telescoping arm;
   a telescoping frame assembly having a mirror and a telescoping motor, the telescoping frame assembly being disposed proximate to each distal end of the first and second telescoping arms;

wherein the first powerfold motor is affixed to a proximate end of the first telescoping arm and is configured to rotate the first telescoping arm about an axis, and the second powerfold motor is affixed to a proximate end of the second telescoping arm and is configured to rotate the second telescoping arm about the axis;

wherein the first and second powerfold motors are configured to operate independently of each other; and wherein the telescoping frame assembly is configured to maintain the distance between the first and second telescoping arms as the first and second powerfold motors independently rotate the first and second telescoping arms.

15. A power telescoping mirror pivot assembly, comprising:

a base frame;

a first powerfold motor and a second powerfold motor mounted to the base frame;

a first telescoping arm and a second telescoping arm, wherein the first telescoping arm is fixably attached to the first powerfold motor at a first end of the first telescoping arm and the second telescoping arm is fixably attached to the second powerfold motor at a first end of the second telescoping arm;

a telescoping frame assembly comprising a telescoping motor, wherein the telescoping motor is attached at a second end of the first telescoping arm and also attached at a second end of the second telescoping arms;

a mirror head fixably attached to the telescoping frame assembly; and a slidable cover assembly attached at a pivot mounting frame, the slidable cover assembly comprising a base cover which is attached to the base fame and a slidable cover which is attached to the mirror head and slides with respect to the base cover.

16. A power telescoping mirror pivot assembly, comprising:

a base frame;

a first telescoping arm and a second telescoping arm, wherein the first telescoping arm is pivotally attached at its first end of the base frame and the second telescoping arm is pivotally attached at its first end to the base frame;

a telescoping frame assembly comprising a telescoping motor, wherein the telescoping motor is mounted to the telescoping frame assembly and is attached at a second end of the first telescoping arm and at a second end of the second telescoping arms;

a mirror head fixably attached to the telescoping frame assembly; and a slidable cover assembly attached at a pivot mounting frame, the slidable cover assembly comprising a base cover which is attached to the base fame and a slidable cover which is attached to the mirror head and slides with respect to the base cover.

\* \* \* \* \*